United States Patent [19]

Mody

[11] Patent Number: 4,890,129

[45] Date of Patent: Dec. 26, 1989

[54] EXPOSURE CONTROL DEVICE

[75] Inventor: Hemant K. Mody, Rochester, N.Y.

[73] Assignee: Eastman Kodak Company, Rochester, N.Y.

[21] Appl. No.: 333,853

[22] Filed: Apr. 4, 1989

Related U.S. Application Data

[63] Continuation of Ser. No. 132,744, Dec. 14, 1987, abandoned.

[51] Int. Cl.$^4$ .................. G03B 9/36; H01H 47/00
[52] U.S. Cl. ............................. 354/234.1; 361/147
[58] Field of Search ............... 354/234.1, 235.1; 361/147

[56] References Cited

U.S. PATENT DOCUMENTS

| | | | |
|---|---|---|---|
| 3,458,769 | 7/1969 | Stampfli | 361/147 |
| 3,634,735 | 1/1972 | Komatsu | 361/147 X |
| 3,987,473 | 10/1976 | Kondo | 354/234 |
| 4,011,003 | 3/1977 | Dragt | 350/6 |
| 4,051,499 | 9/1977 | Kondo | 354/234 |
| 4,313,659 | 2/1982 | Saito et al. | 354/234 |
| 4,458,227 | 7/1984 | Petersen | 335/222 |
| 4,497,557 | 2/1985 | Petersen | 354/234.1 |
| 4,514,065 | 4/1985 | Carrera | 354/235.1 |

*Primary Examiner*—Michael L. Gellner
*Attorney, Agent, or Firm*—Donald D. Schaper

[57] ABSTRACT

An exposure control device is disclosed in which a member formed of a magnetic material is movable relative to a frame along a predetermined path to control the passage of light along an optical axis. Electromagnets are located on the frame at opposite ends of the path. In order to keep the mass of the movable member as small as possible, no magnetic elements are located on the member. Permanent magnets are located on opposite sides of the path and function with the electromagnets to move the member, keep the member suspended in a direction transverse to the direction of movement, and hold the member in one of two positions when the electromagnets are not energized.

7 Claims, 5 Drawing Sheets

FIG.IIA  FIG.IIB  FIG.IIC  FIG.IID  FIG.IIE

FIG.12

EXPOSURE CONTROL DEVICE

This is a continuation of application Ser. No. 132,741, filed Dec. 14, 1987, abandoned.

CROSS REFERENCE TO RELATED APPLICATIONS

Reference is made to commonly-assigned U.S. patent application, Ser. No. 132,732, entitled Axial Magnetic Actuator, filed in the name of Hemant K. Mody on even date herewith, and to commonly-assigned U.S. patent application, Ser. No. 132,731, entitled Magnetic Actuator, filed in the name of Hemant K. Mody on even date herewith.

BACKGROUND OF THE INVENTION

1. Field of the Invention

The present invention relates to an exposure control device, and more particularly, to such an device which is particularly suitable for use in high-speed, precision applications.

2. State of the Prior Art

Magnetic actuators are known for moving elements in various types of mechanisms. In certain of these mechanisms, it is desirable for the movable element to be as light as possible, to move silently, and with a minimum of friction. One of the problems in magnetic actuators of a bidirectional type is that a magnetic element, such as a coil or a permanent magnet, must be incorporated in the movable element; this increases the mass of the element and hence the power requirements of the actuator.

In U.S. Pat. No. 4,051,499, there is disclosed a focal plane shutter having leading and trailing blinds made of opaque plastic sheet material. A thin permanent magnet is sealed in each of the blinds. A series of electromagnetic coils are located along the path of each blind, and the coils are sequentially energized to drive the blinds in accordance with the principle of a linear motor. Such an arrangement has the disadvantage that a number of coils and relatively complex drive electronics are required. It also has the disadvantage noted above, that is, the movable elements have a relatively high mass as a result of the magnets being incorporated in the blinds.

SUMMARY OF THE INVENTION

It is an object of the invention to overcome the problems in the prior art and to provide an exposure control device which has improved operating characteristics.

In accordance with one aspect of the present invention, there is provided an exposure control device for controlling the passage of light along an optical axis, the device comprising: a member formed of a magnetic material, the member being movable along a path between a first position in which light passes along the axis and a second position in which no light passes along the axis; magnetic means for forming a magnetic circuit adjacent the member which is adapted to hold the member in at least one of the positions; and means for creating an imbalance in the circuit to effect movement of the member relative to the magnetic means.

In one embodiment of the present invention, an aperture blade formed of a magnetic material is adapted to be moved along a predetermined path between two locations. An electromagnet is disposed adjacent each of the locations. One permanent magnet is disposed generally parallel to the path and above the blade, and a second permanent magnet is disposed generally parallel to the path and below the blade. The electromagnets are energized by electrical pulses to move the blade between the two locations.

An advantage of the present invention is that the exposure control device incorporates the permanent magnets in a manner to provide two features: (1) magnetic suspension normal to the plane of the blade; and (2) magnetic energy minima at either end of the blade movement, or stroke. The first feature, combined with the low mass of the blade, impress minimal power requirements on the electromagnets. The second feature ensures a bistable blade, that is, no current is required to maintain the blade in a closed or an open state. Other advantages of the invention are: dynamic braking is not required; low-peak power is required to drive the device; and the device can be driven with a very simple drive waveform.

Other features and advantages will become apparent with reference to the following Description of the Preferred Embodiment when read in light of the attached drawings.

DESCRIPTION OF PREFERRED EMBODIMENTS

Figure 1:
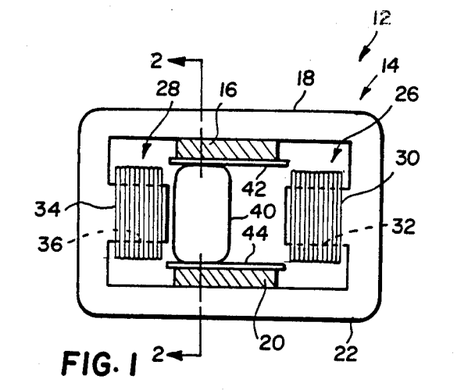
FIG. 1 is a front elevational view of a exposure control device of the present invention.
Figure 2:
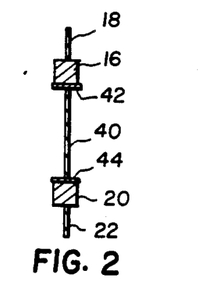
FIG. 2 is a sectional view, taken along the line 2—2 in FIG. 1.

In FIGS. 1, there is shown an exposure control device 12 constructed in accordance with the present invention. Device 12 is particularly adapted for use in apparatus such as an electronic camera (not shown). Device 12 comprises a frame 14, a permanent magnet 16 fixed to a top frame member 18, and a permanent magnet 20 fixed to a bottom frame member 22. Electromagnets 26 and 28 are disposed at opposite sides of device 12, as viewed in FIG. 1. Electromagnet 26 includes a coil 30 and a core 32 which is integral with frame 14, and electromagnet 28 includes a coil 34 and a core 36 which is also part of frame 14. A planar member, or aperture blade 40 is movable on tracks 42 and 44 between a first position adjacent coil 34, shown in FIG. 1, and a second position adjacent coil 30. The first position can be, for example, a "closed position" of the exposure control device 12 in which the blade 40 covers an aperture (not shown) arranged along an optical axis (not shown), and the second position can be, for example, an "open position" of the device 12 in which light can pass through the aperture. Frame 14 and blade 40 can be made from any magnetizable material, for example, silicon steel, permalloy, or mu metal. The frame provides a low reluctance path for the flux from permanent magnets 16 and 20 and electromagnets 26 and 28, and frame 14 also serves to define the air gap between member 40 and electromagnets 26 and 28.

Figure 3:
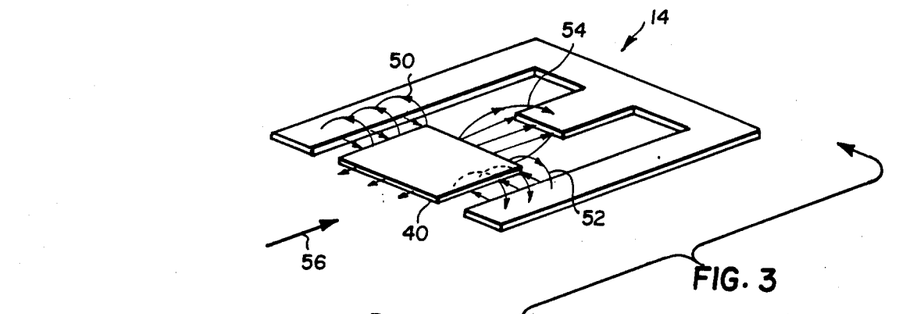
FIG. 3 is a perspective view of the frame of the exposure control device showing lines of force from the permanent magnets.

The two permanent magnets 16 and 20 produce magnetic fields which combine to form a magnetic circuit in which blade 40 operates. In FIG. 3, lines 50 and 52 indicate, schematically, the direction of the lines of force of permanent magnets 16 and 20, respectively, and lines 54 indicate, schematically, the direction of lines of force produced by the combined effect of magnets 16 and 20. The lines of force indicated by lines 54 tend to move blade 40 in the direction of arrow 56 and along an X axis as shown in diagram 49. As shown in FIG. 3, the magnetic fields of permanent magnets 16 and 20 tend to oppose each other; this causes the flux leaving magnets 16 and 20 along the Y axis to gradually bend in the direction of the X axis. Thus, if blade 40 is closer, to for example, electromagnet 26, the flux leaving the edge of the blade 40 closer to electromagnet 26 is greater than that leaving the edge facing electromagnet 28. This causes a magnetic energy differential which renders the blade 40 bistable along the X axis, that is, along the path of movement.

The motion of blade 40 is effected by energizing coils 30 and 34 in a manner such as to buck and boost the magnetic field at the trailing and leading edges, respectively, of the blade 40. The direction of motion is determined by the direction of current in coils 30 and 34. Thus, assuming that blade 40 is resting adjacent coil 30 at the start of operation, coils 30 and 34 are energized so that the flux emanating from the side of blade 40 adjacent 30 is bucked and the flux on the side of blade 40 nearest coil 34 is enhanced; this causes blade 40 to move toward coil 34. Reversing the current direction in coils 30 and 34 causes the blade to move in the opposite direction. Thus, it will be seen that electromagnets 26 and 28 serve as a means for creating an imbalance in the magnetic circuit to effect the movement of blade 40. Although coils 30 and 34 are shown as separate elements, the coils could be formed from one continuous conductor since they are both energized with current of the same polarity.

Figure 6A:
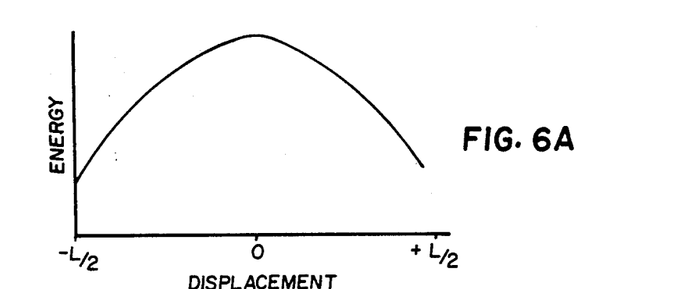
FIG. 6A is a plot of stored energy versus displacement of the blade when the electromagnets are deenergized and one permanent magnet is polarized in a direction opposite to the other permanent magnet.
Figure 7:
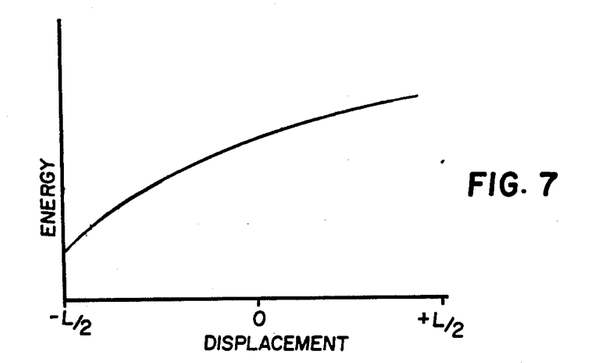
FIG. 7 is a plot of stored energy versus displacement of the blade when the electromagnets are energized to move the blade to the left.

In FIG. 6A, there is shown a representation of the stored energy in the magnetic circuit when coils 30 and 34 are not energized. The total displacement of blade 40 along its path of travel is considered to be L, with 0 designating a midpoint in the path of travel, $-L/2$ designating a position at one end of the path, and $L/2$ designating a position at the opposite end of the path. Blade 40 moves to the position at least energy which is at either end of the curve, that is, at position $-L/2$ or $L/2$. To effect movement of blade 40, for example from position $L/2$ to $-L/2$, coils 30 and 34 are energized which produces stored energy in the circuit as shown by the curve in FIG. 7. The current in coils 30 and 34 is reversed to effect movement of blade 40 from $-L/2$ to $L/2$; in this case, the stored energy curve (not shown) would be the reverse of the curve shown in FIG. 7, that is, high energy at $-L/2$ and low energy at $L/2$.

The force on the blade 40 due to the permanent magnets 16 and 20 increases rapidly as the air gap between blade 40 and one of the electromagnets 26, 28, decreases. At the end of the stroke of blade 40, the force on the blade 40 can be large enough to prevent a noticeable bounce. As a result of this force, no dynamic braking is required in actuator 12. In many prior-art actuators, it is necessary to provide dynamic braking by, for example, reversing the current near the end of the stroke, in order to prevent bounce of a movable member. The force on blade 40 due to magnets 16 and 20 also has the effect of reducing the power requirements of the electromagnets 26 and 28. In one representative example, magnets 16 and 20 are selected such that each magnet 16, 20, produces a force equivalent to the force produced by one of the electromagnets 26, 28, and thus, the power requirements are reduced by one-half.

Figure 6B:
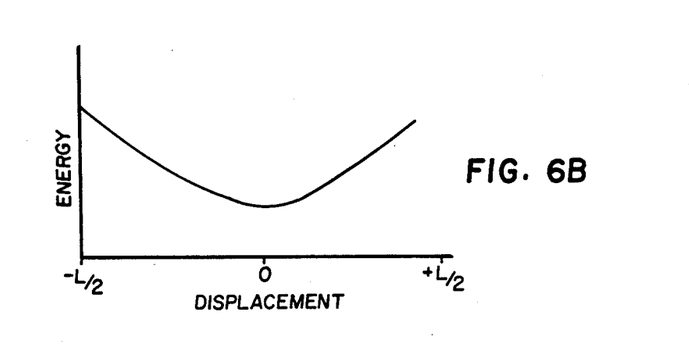
FIG. 6B is a plot of stored energy versus displacement of the blade when the electromagnets are deenergized and both permanent magnets are polarized in the same direction.

The effect of having magnetic energy minima at the end of the stroke of blade 40, as shown in FIG. 6A, ensures a bistable blade, that is, no current is required to maintain the blade in either of the two positions $-L/2$, $L/2$. It is also possible for blade 40 to be monostable, that is, to be maintained in a single position by permanent magnets 16 and 20, for example, in a position intermediate the two electromagnets 26 and 28. In this case, permanent magnets 16 and 20 would be polarized in the same direction, and the resulting energy distribution from the two permanent magnets 16 and 20 would be as shown in FIG. 6B. As shown in FIG. 6B, blade 40 would be maintained at the 0 position.

Figure 4:
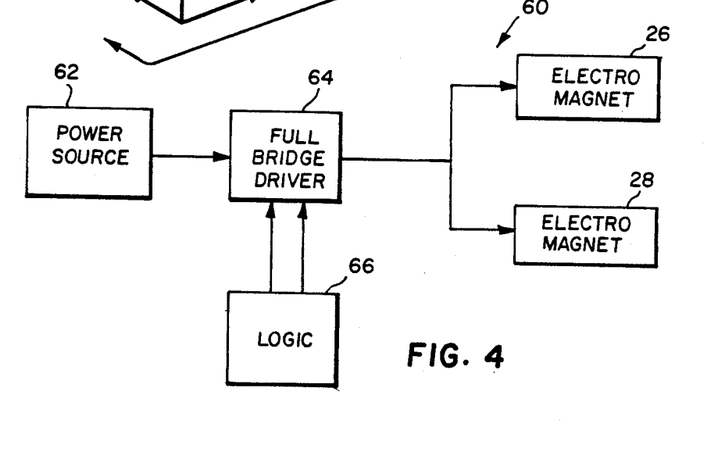
FIG. 4 is a block diagram of the driver for the exposure control device.

Current is supplied to coils 30 and 34 by means of a driver 60 (FIG. 4) which includes a power source 62, a full bridge driver 64, and a logic module 66. Driver 64 can be, for example, a Model JDN 1953B, obtainable from the Sprague Co., and the logic module 66 can include a dual single shot (not shown) which can be a Model 96LS02, obtainable from the Fairchild Co. In applications, such as in an electronic camera (not shown), device 12 is driven by current pulses, and the exposure duration can be regulated by changing the delay between pulses.

Figure 5:
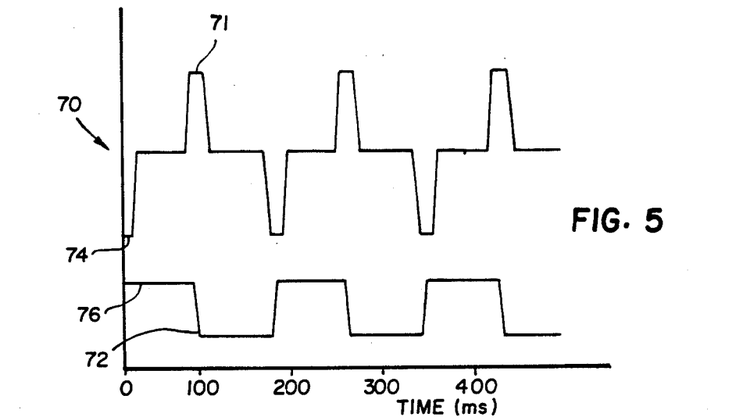
FIG. 5 is a graphical representation showing the timing of the opening and closing of the device in relation to the timing of the drive pulses.

With reference to FIG. 5, there are shown a waveform 70 which represents input pulses to device 12 and a waveform 73 which illustrates the opening and closing of blade 40 in response to the pulses in waveform 70. Positive current pulses 71 are provided to move blade 40 to the closed position, the closed position being indicated by lines 72, and negative current pulses 74 are provided to move the blade 40 to the open position, the open position being indicated by lines 76. Device 12 can be operated to open and close in less than 5 milliseconds.

Figure 8A:
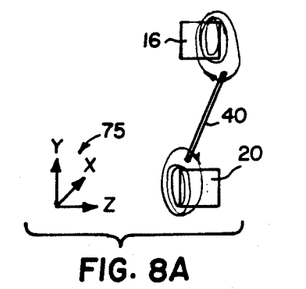
FIGS. 8A-8C are illustrations of the magnetic forces which suspend the blade along the Z axis.
Figure 8B:
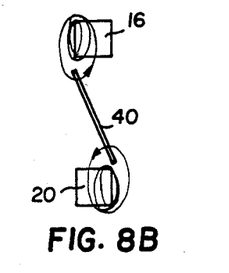
Figure 8C:
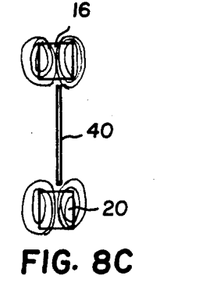
Figure 9:
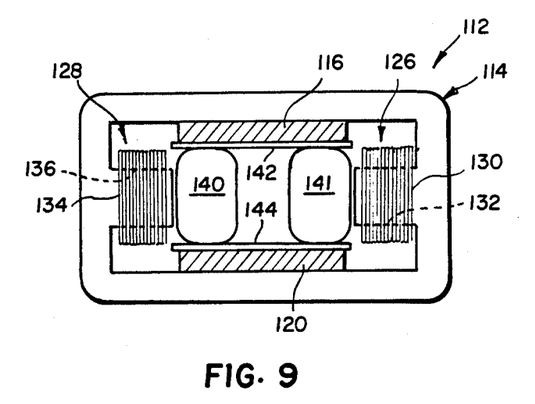
FIG. 9 is a front elevational view of a second embodiment of the present invention.
Figure 10:
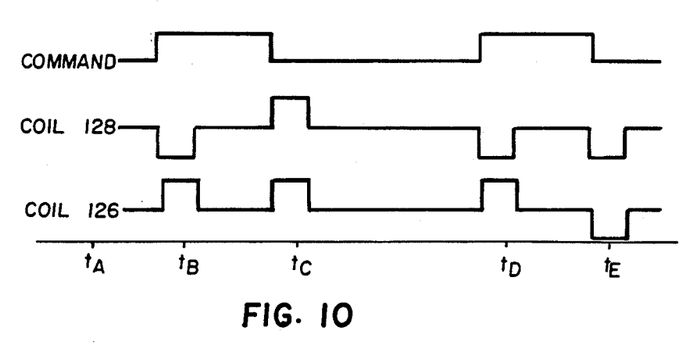
FIG. 10 is a timing diagram of the operation of the embodiment shown in FIG. 9.

As noted above, the magnetic circuit in device 12 incorporates permanent magnets 16 and 18 in a manner to provide magnetic energy minima at either end of the path of blade 40. The magnetic circuit also provides magnetic suspension along one degree of freedom which is, in the case of device 12, in a direction normal to the plane of blade 40. As a result of the combined effect of the magnetic suspension of the blade 40 and the low mass of blade 40, minimal power requirements are imposed on the electromagnets 26 and 28. In FIGS. 8A-8C, there are shown the magnetic forces from magnets 16 and 20 which support blade 40 along the Z axis as defined by diagram 75, that is, in a direction transverse to the path of movement and to plane of blade 40. The equilibrium position of blade 40 is shown in FIG. 8C. Any tendency of the blade 40 to move from the equilibrium position of FIG. 8C will be resisted by the magnetic flux generated by magnets 16 and 20, as shown schematically in FIGS. 8A and 8B, and the blade will be maintained in the equilibrium position.

In one representative example of device 12, frame 14 is formed from silicon steel, the outside dimensions of frame 14 are approximately 6.096 cm by 3.556 cm, and the thickness of the frame is about 0.018 cm. Permanent magnets 16 and 20 are square in cross section, as viewed in FIG. 2, and each side is approximately 0.3175 cm; the length of magnets 16 and 20 is about 2.286 cm, as viewed in FIG. 1. The material of the permanent magnets 16 and 20 is Ceramic 8, obtainable from Hitachi Magents Corp. Each of the coils 30, 34, is formed from 32 AWG copper wire and has approximately 450 windings. Blade 40 is formed from silicon steel, the outside dimensions are approximately 1.778 cm by 1.27 cm, as viewed in FIG. 1, the thickness is about 0.0051 cm, and the mass is about 0.087 grams. A device of the type described in this example has been used successfully as a shutter in an electronic camera in which the blade 40 is driven to open and close the shutter ten times per seconds by current pulses of approximately 0.36 amperes.

With reference to FIGS. 9-11E, there is shown a second embodiment of the present invention in the form of an exposure control device 112. Device 112 comprises blades 140 and 141, a frame 114, permanent magnets 116 and 120, and electromagnets 126 and 128. Electromagnet 126 includes a coil 130 and a core 132 which in part of frame 114, and electromagnet 128 includes a coil 134 and a core 136 which is also part of frame 114. Blades 140 and 141 are movable between tracks 142 and 144 to the various positions shown in FIGS. 11A-11E by means of current pulses to coils 130 and 134 are indicated in the timing diagram shown in FIG. 10.

Figure 12:
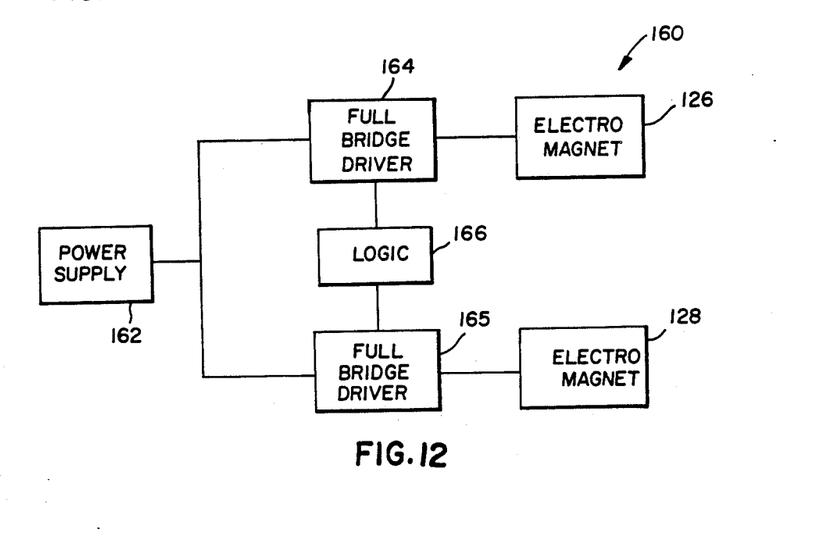
FIG. 12 is a block diagram of the driver for the embodiment of the invention shown in FIG. 9.

Current is supplied to device 112 by a driver 160 shown in FIG. 12. As shown in FIG. 12, driver 160 comprises a power supply 162, a full bridge driver 164 which supplies current to electromagnet 126 and a full bridge driver 165 which supplies current to electromagnet 128. Full bridge drivers 164 and 165 are controlled by a logic module 166. The electrical components which make up driver 160 can be of same type as described previously for driver 60.

Figure 11A:
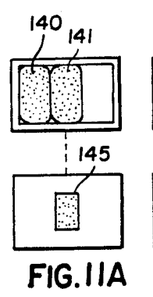
FIGS. 11A-11E show the sequence of operation for the embodiment shown in FIG. 6.
Figure 11B:
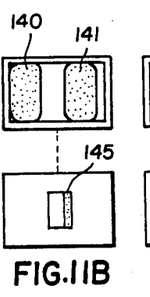
Figures 11C, 11D, 11E:
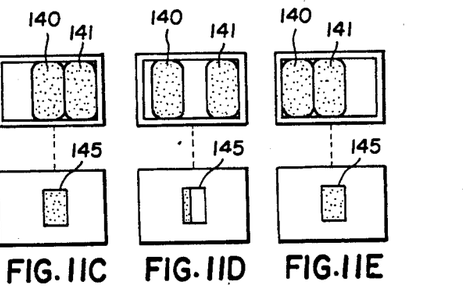

The operation of shutter 112 can be shown with reference to FIGS. 10 and 11A-11E. At time $t_A$ in FIG. 10 when no current is applied to coils 126 and 128, the blades 140 and 141 assume a rest position in which they cover an aperture 145 as shown in FIG. 11A. When a negative pulse is applied to coil 128 and a positive pulse is applied to coil 126 as indicated at $t_B$ in FIG. 10, the blades 140, 141, assume the positions shown in FIG. 11B in which aperture 145 is not covered. Two positive pulses are then provided to coils 128 and 126 at $t_C$ to make the blades 140 and 141 assume the positions shown in FIG. 11C in which the aperture 145 is again covered. A negative pulse to coil 128 and a positive pulse to coil 126 at $t_D$ position the blades 140, 141, as shown in FIG. 11D, and negative pulses to both coils 128, 126 at $t_E$ move the blades 140, 141 back to the rest position shown in FIG. 11E where aperture 145 is covered. Device 112 has all of the advantages discussed above with respect to device 12, and in addition, the advantages of a two-blade shutter which are well known in the art. Further, device 112 does not have many of the disadvantages often associated with two-blade shutters such as the complex actuating mechanisms required to move the blades.

The blades 40, 140 and 141 have been disclosed herein as being solid. It will be apparent that the blades could be of a type having cutout portions therein, and such blades could be incorporated in the exposure control device of the present invention to control light along an optical axis.

The invention has been described in detail with particular reference to a preferred embodiment thereof, but it will be understood that variations and modifications can be effected within the spirit and scope of the invention.

I claim:

1. An exposure control device for controlling the passage of light along an optical axis, said device comprising:
   a frame, a substantial portion of said frame being formed of a magnetic material which provides a low reluctance path for magnetic flux;
   a blade, a substantial portion of said blade being formed of a magnetic material which provides a low reluctance path for magnetic flux, said blade being movable relative to said frame along a generally linear path between a first position in which light passes along said axis and a second position in which no light passes along the axis;
   magnetic means for forming a magnetic circuit adjacent said blade, said magnetic means being adapted to hold said blade in either of said positions and including a first permanent magnet located on one side of said generally linear path and a second permanent magnet located on an opposite side thereof, said magnetic means generating magnetic flux in said circuit for suspending said blade and for maintaining said blade in position relative to said frame along one degree of freedom; and
   means for creating an imbalance in said circuit to effect movement of said blade relative to said magnetic means, said means for creating an imbalance including a first electromagnet located adjacent said first position and a second electromagnet located adjacent said second position and further including means for providing a train of pulses to said electromagnets.

2. An exposure control device, as defined in claim 1, wherein said blade is formed from silicon steel.

3. An exposure control device, as defined in claim 1, wherein said device includes a second blade.

4. An exposure control device for controlling light along an optical axis, said device comprising:
   a frame, a substantial portion of said frame being formed of a magnetic material which provides a low reluctance path for magnetic flux;
   a plurality of blades mounted for movement relative to said frame along a generally linear path, a substantial portion of each of said blades being formed of a magnetic material which provides a low reluctance path for magnetic flux;
   magnetic means for generating magnetic flux in said blades and said frame, said magnetic means including permanent magnets arranged on opposite sides of said path;

means for effecting movement of said blades relative to said frame along said generally linear path to positions in which light can pass along said optical axis and to positions in which no light can pass along said axis, said means for effecting movement comprising a first coil at one end of said path and a second coil at an opposite end of said path, and means for producing a current in said coils.

5. An exposure control device, as defined in claim 4, wherein said blades are suspended in a direction transverse to said path by said magnetic means.

6. An exposure control device, as defined in claim 4, wherein said means for producing a current in said coils includes means for providing pulses of current in timed sequence to said coils.

7. An exposure control device, as defined in claim 6, wherein pulses of opposite polarity supplied to said coils effect the separation of said blades and pulses of like polarity supplied to said coils move said blades together.

* * * * *

UNITED STATES PATENT AND TRADEMARK OFFICE
CERTIFICATE OF CORRECTION

PATENT NO. : 4,890,129
DATED : December 26, 1989
INVENTOR(S) : Hemant K. Mody

It is certified that error appears in the above-identified patent and that said Letters Patent is hereby corrected as shown below:

Column 1, line 4, "132,741" should read --132,744--.
Column 2, line 61, "FIGS." should read --FIG.--.
Column 3, line 33, "closer, to" should read --closer to,--; and line 66, "at" should read --of--.
Column 5, line 42, "are" should read --as--.

Signed and Sealed this

Twenty-eighth Day of April, 1992

Attest:

HARRY F. MANBECK, JR.

*Attesting Officer*  *Commissioner of Patents and Trademarks*